United States Patent [19]

Music

[11] Patent Number: 5,448,296

[45] Date of Patent: * Sep. 5, 1995

[54] VARIABLE PARAMETER BLOCK CODING AND DATA COMPRESSION SYSTEM

[76] Inventor: John D. Music, 2970 Glencrest, Pomona, Calif. 91767

[*] Notice: The portion of the term of this patent subsequent to Nov. 17, 2009 has been disclaimed.

[21] Appl. No.: 52,797

[22] Filed: Apr. 23, 1993

[51] Int. Cl.$^6$ ............................................. H04N 7/30
[52] U.S. Cl. .................................. 348/390; 348/391; 348/400
[58] Field of Search ............... 348/390, 391, 393, 396, 348/409, 420, 400, 6, 7, 8; 358/310; H04N 7/13, 7/133

[56] References Cited

U.S. PATENT DOCUMENTS

| | | | |
|---|---|---|---|
| 4,847,677 | 7/1989 | Music et al. | 348/391 |
| 4,914,508 | 4/1990 | Music et al. | 348/391 |
| 4,987,480 | 1/1991 | Lippman et al. | 348/396 |
| 5,047,853 | 9/1991 | Hoffert et al. | 348/396 |
| 5,067,010 | 11/1991 | Ishii et al. | 348/396 |
| 5,072,290 | 12/1991 | Yamagami et al. | 348/396 |
| 5,107,345 | 4/1992 | Lee | 348/420 |
| 5,164,819 | 11/1992 | Music | 348/420 |
| 5,253,078 | 10/1993 | Balkanski et al. | 348/409 |

*Primary Examiner*—Tommy P. Chin
*Assistant Examiner*—Huy Nguyen
*Attorney, Agent, or Firm*—Boniard I. Brown

[57] ABSTRACT

A block coding system wherein switching block coding integrated circuit chips changes the coding parameters by selecting the number of colors per block from the minimum of two to six or more, and selecting the block size correspondingly to maintain coding efficiency, thus to insure quality of color in video data transferred over medium to narrow-band paths. Switching integrated circuit chips in the system can set coding parameters for the acceptable degree of degradation by data compression block coding of any type of structured data, including digital television signals transferable over a data path of medium to narrow bandwidth.

7 Claims, 2 Drawing Sheets

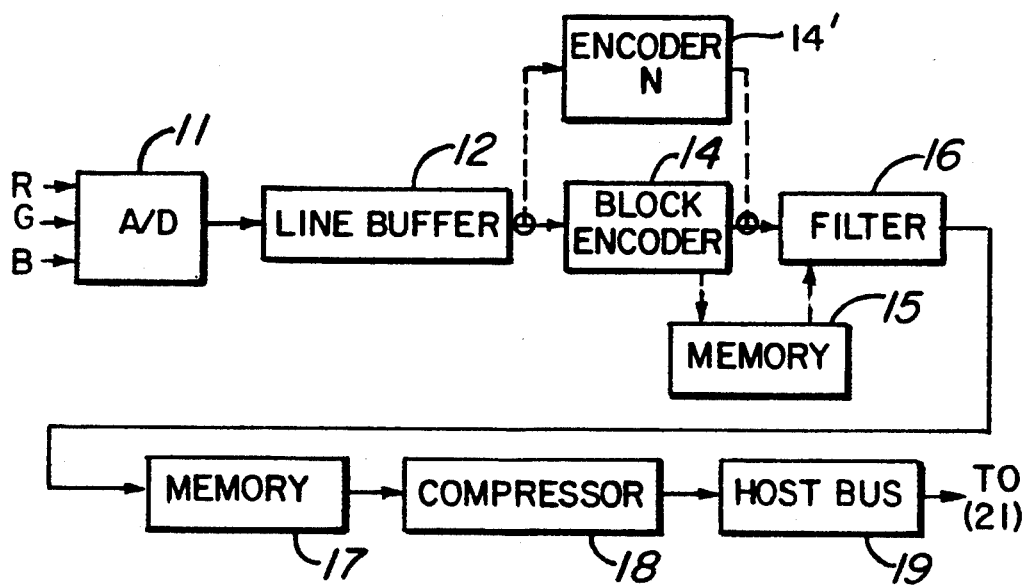
FIG.—1
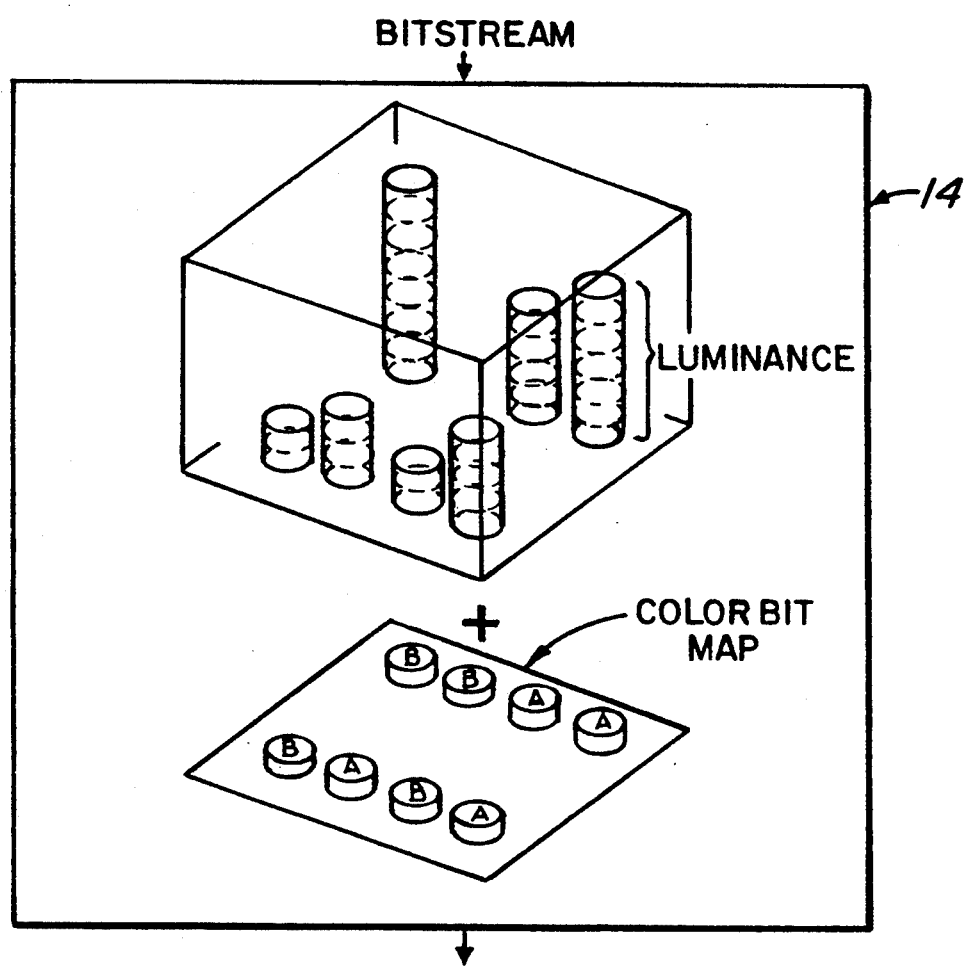
FIG.—2

VARIABLE PARAMETER BLOCK CODING AND DATA COMPRESSION SYSTEM

BACKGROUND OF THE INVENTION

1. Field of the Invention

The present invention relates generally to information signal processing and in particular to the field of processing time sequential information signals such as video signals for the purpose of compressing the amount of information to be stored, for example, on compact disk, or transferred from an encoding site to a decoding site, as in transmitting color video imaging signals over hard wire intra-system lines or telephone video links.

2. Prior Art

In the prior art, a three step block coding system for the efficient encoding of TV signals usually involves sampling, transformation and quantization. The transformation step, which most commonly uses the Discrete Cosine Transform method, is a computation-intensive procedure involving matrix multiplication. The intensity of this computational procedure, especially where real-time coding is required, greatly increases the complexity of practical coding schemes.

U.S. Pat. No. 5,164,819, recently issued to the present inventor, relates to a two-color system, which establishes a minimum for the amount of data that must be transmitted for true color rendition.

SUMMARY OF THE INVENTION

The novel block coding and compression system of this invention is a part of a data transfer system or "link" that connects a coder/compressor, the data transfer medium, and the decompressor/decoder.

For a narrow bandwidth data transfer medium such as a telephone line, video data must be compressed in order to preserve image definition and color fidelity. Similarly, in storing color video data in digital form on a compact disk, data compression can increase the subjective storage capacity for high quality color video data on the disk by two orders of magnitude because redundant data is eliminated in the coding and compression process. Video data can also be compressed for transfer over the narrow-bandwidth busses of a computer, or over a hard wire cable television link (as contrasted with Coaxial cable which is a wide-band medium). Examples of this would be an intra-mural telephone network or existing power distribution lines.

In a missile guidance system based on television derived target data, the compressed/encoded television data can be transferred via narrow-bandwidth interconnection busses to a guidance system that employs the decompressor/decoder.

In the generic invention of the novel block coding and data compression system, theoretically, any data that is structured; i.e., can be split up into repetitive segments as in the fields, frames and elements (pixels) of a video transmission, can be acted upon by the invention to eliminate redundancies in the data while preserving the information content. In business communications, data in the form of blocks can be compressed to minimize the amount of data that has to be transmitted over narrow band data paths.

In the field of computers, internal operations can be made responsive only to changes in the data on a bus by block coding and compressing the data in accordance with the invention.

It is desirable to be able to set the compression parameters to attain low bit error rates and optimum data or color quality in all applications of the compression system. Although the novel variable parameter block coder and data compression system is applicable to any equivalent form of structured data bit stream, it will be described here with reference to a color video data bit stream. The new approach for transfer of video data in accordance with the present invention is to choose the number of colors that produces the minimum acceptable color distortion in any specific application, and correspondingly to choose the block size to maintain coding efficiency. According to the invention, the analog video signal is digitized and encoded into blocks of elements wherein the minimum number of colors is chosen, e.g., two, and the average luminance is determined for each color in the block. Then, the average luminance of all the individual color components for pixels that are greater than the average luminance for each color is determined. Components for pixels that are equal to or less than the average luminance for each color are eliminated for compression of the color data.

Using only two colors per block can result in a certain amount of distortion, depending on block size. The larger the block size, the more likely that using only two colors will result in distortion. There is a tradeoff between the number of colors, block size and coding efficiency. For links requiring a higher degree of color fidelity while maintaining the same degree of compression, four colors could be used per block instead of two, and the block size doubled to 4×4 instead of 2×4. The coding efficiency would remain the same but the color fidelity over the link would be higher. The concept of increasing the number of colors per block and increasing the block size correspondingly is extensible to four colors, five colors, etc.

As an example, in the case of three colors per block, the highest value of luminance, the lowest value of luminance, and the median value of luminance could be determined. Comparators then would be used to find and separate those pixels that are closest to the high value, i.e., color C, those that are closest to the low value—color B, and those that are closest to the median value—color A. The bit map then would be a variable number of bits per pixel, either 1 bit or 2 bits as follows:

0=color A=median value
01=color B=low value
11=color C=high value

There is a high statistical probability that most pixels will be nearest the median value and that therefore the average number of bits per pixel in the bit map would be less than 2. Actual experimentation shows that the average number of bits per pixel in the bit map varies from between 1.2 bits per pixel to 1.8 bits per pixel.

In the system including the encoding and decoding parameters readily changeable to accommodate the characteristics of the data transfer path, such as its bandwidth and the specific application, this can be accomplished in the invention by electrically switching block coding circuit chips, so that the operator of the link has the option of changing the coding: i.e., the number of colors and the size of the block. As many as six combinations or more can be selected by switching means. The switching is preferably done by diode circuits well known in the art, or by rotary contact switches. Alternatively, plug-in coding modules can be used.

BRIEF DESCRIPTION OF THE DRAWINGS

FIG. 1 is a block diagram of a video communications link in which switch-selectable encoding combinations are utilized;

FIG. 2 is a conceptual isometric drawing of the encoding scheme illustrating a 2-color and 2×4 matrix size combination;

DETAILED DESCRIPTION OF THE PREFERRED EMBODIMENTS

Figure 3:
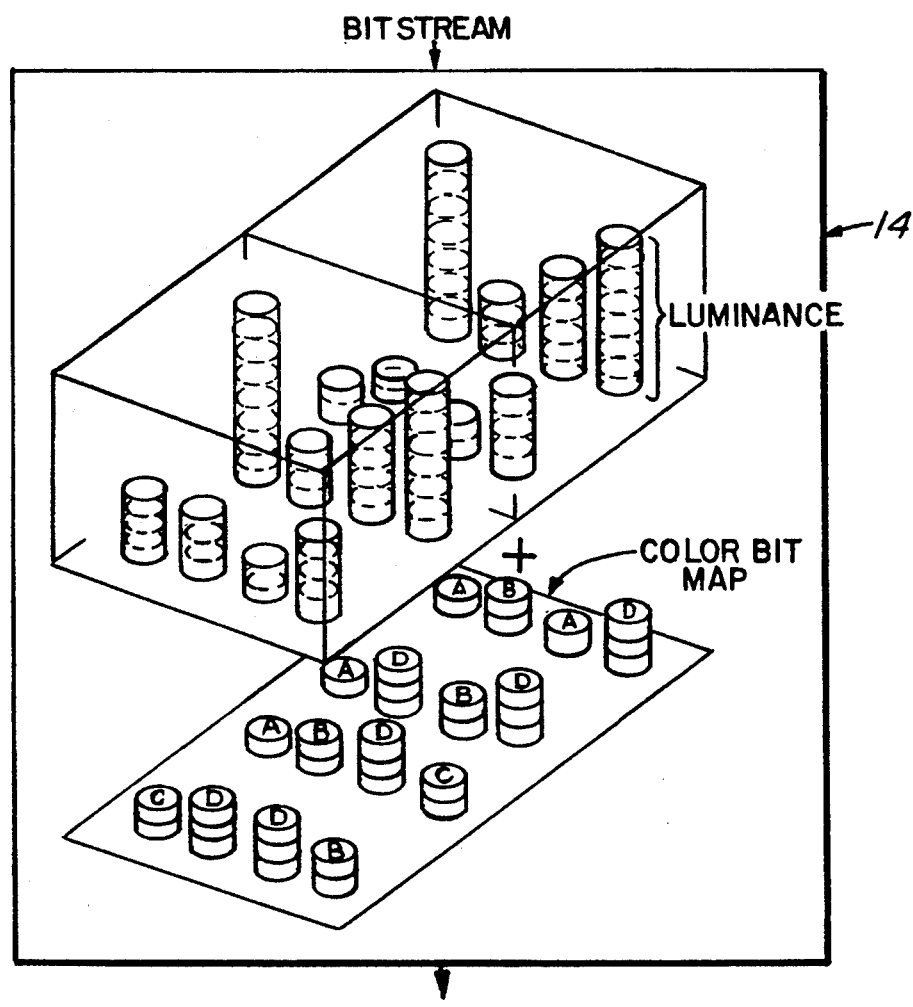
FIG. 3 is a conceptual drawing of the encoding scheme illustrating a 4-color and 4×4 matrix size combination.

Referring to the block diagram of FIG. 1, and to block coder of FIG. 2, the RGB data output from any NTSC formatted device such as a video camera, disk player or video cassette player, for example, is an analog signal that can be digitized in the analog-to-digital converter 11. At this point, there is a digital television data stream, the digital output representing a line of a frame of video being stored in a buffer 12. The line is operated upon by the block encoder 14 or 14' which splits it into blocks or matrices of, for example, 3×3 or 9 pixels, i.e., nine two-color picture elements having a digital luminance value and a bit map digit indicating which of two colors A or B describe the pixel. The block coding method is predicated on the premise that there is a finite quantity of non-redundant elements existing with a block, namely, two, that are designated color A and color B. A bit map of the matrix is generated with one bit per pixel. If the bit in the bit map is a 1 then that pixel is color A and if a 0, the pixel is color B. Thus, each block initially consists of 3 elements of information: Color A, Color B, and a bit map. The size of these elements of information depend on (a) the required color accuracy and (b) the number of pixels in the matrix. For example, if 15 bits of color accuracy is required in a system using the invention, and a matrix size of 3×3 elements (15×2)=9 (i.e., one bit per pixel)=39 bits of information for each block. Since there are 9 pixels in the matrix, this would be 39 divided by 9 which is a compression equal to 4 and $\frac{1}{3}$ per pixel. Since there are in a television frame 240×500 picture elements, there would be 13,333 blocks per TV field. Other matrix block sizes are easily implemented with comparable results.

According to the invention, a plurality of encoder chips N, each having a different block size and a different number of colors, can be selectively switched into the system. For any given data path, some N would be optimum for color fidelity, assuming that the minimum of two colors has some degradation or, at the other extreme, that the bandwidth of the data path is not a limiting factor and data compression is not required.

Referring back to FIG. 1, after block compression and filtering in elements 15, 16 and storage in memory 17, the digital video color signal emanating from the compressor 18 is composed of the lowest number of bits required to faithfully reproduce the R G B input signal when transmitted over a host bus control system, such as in aircraft and missile technologies or in transmitting images over telephone lines where the bit rate must be low to prevent degradation of high frequency portions of the images transmitted.

Referring to FIG. 2, which is a three dimensional representation of the block encoder showing a 2×4 matrix or pixel block, and including the bit map showing whether the corresponding pixel is color A or color B in the novel two-color + bit map encoder. The attributes of each pixel are encoded into the digital word represented by its height or digital length. These include the color designation, A or B, and the differences from the corresponding pixel in the previous frame and in the previous block. Because there are in a television frame 240×500 picture elements, there would be 15,000 of the 2×4 blocks per TV field. A digital word is added to indicate the pixel luminance or color value.

The bit map also can have variable height because it encodes a variable word length designating in which of five groups of map patterns a block belongs, according to the probability of occurrence distribution of specific map patterns.

Various block sizes (2×2, 3×2, 4×2, 2×3, 3×3, 4×3, 2×4, 3×4 and 4×4) have been modeled with actual video images encoded and decoded to observe the visual results of the distortion. Smaller block sizes result in less distortion but produce less coding efficiency. Using the values cited earlier for a 3×3 block which produces $4\frac{1}{3}$ bits per pixel, a 2×2 block would produce $((2\times 15)+4)/4=8\frac{1}{2}$ bits per pixel.

If the block coding scheme were the only element used, the tradeoff of efficiency vs. distortion could be made on its own merits. However, because of subsequent intra-frame and inter-frame coding techniques, a smaller block size can be nearly as efficient as larger block sizes. After intra-frame and inter-frame redundancies are characterized, the difference in coding efficiency vs. block size is only slight.

FIG. 3 shows a conceptual drawing of the encoding scheme illustrating a 4-color and 4×4 matrix size combination, which could be one of the switchable coder chips 14' (FIG. 1). The block size has been doubled over that of FIG. 2, and the number of colors has been doubled. The coding efficiency has been shown to remain constant.

Figure 4:
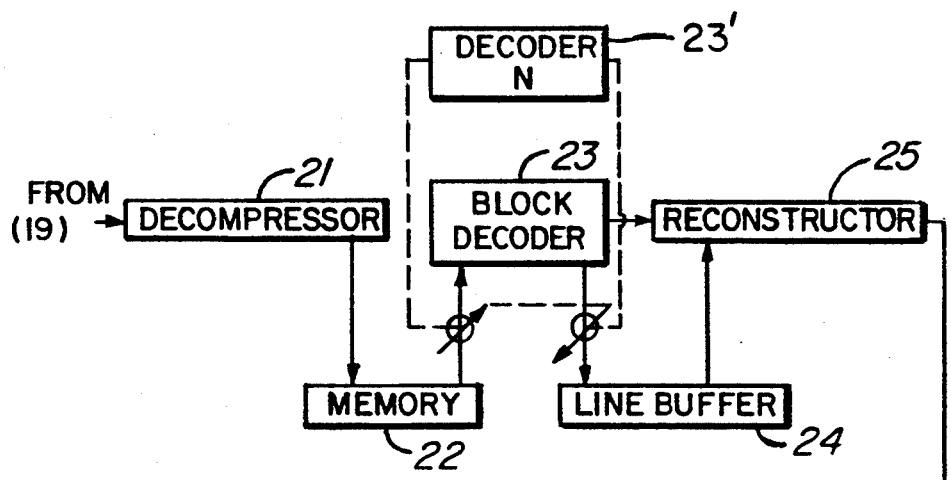
FIG. 4 is a block diagram of the decoding system of a link showing switch-selectable decoding functions.

As an example, in the case of four colors per block, there could be determined highest value of luminance, the lowest value of luminance, and the median 1 and median 2 values of luminance. Comparators then would be used to find and separate those pixels that are closest to the high value, i.e., color D, those that are closest to the low value, color A, and those that are closest to the median values, colors B and C. The bit map then would be a variable number of bits per pixel, either 1 bit, 2 bits or 3 bits as follows:

0 = color A = low value
01 = color B = median 1 value
11 = color C = median 2 value
001 = color D = high value Referring to FIG. 4, there is shown a functional flow diagram of the decompressor-decoder. Basically, the flow is in reverse order from the encoder-compressor. The decompressor 21 involves reconstructing each frame from the frame bit map and placing it into frame memory 22. Then, block bit map is used to decode the color values with reference to a look-up table in the block decoder 23. This is done on a line basis and the result is stored in a line buffer 24 which memorizes the previous line for applying error correction algorithms in the reconstructor 25. The output of the reconstructor is digital-to-analog converted to recover the R G B colored sequential video frame signal. The block decoder 23 is switchable in lieu of block decoder 23, for the purpose of optimizing performance and color fidelity over the link by selecting the number of colors and the corresponding block size, as described earlier with reference to the encoder.

Thus there has been shown and described a novel variable parameter block coding and data compression system which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. An encoder-compressor for color video imaging systems wherein each line of a frame of an R G B analog video signal is digitized and the digital video data stream is block-encoded into variable size matrices of color pixels with luminance, and is bit mapped in groups of variable bit length for compression of the video data by differencing present block and previous block and differencing present frame and previous frame to discover only non-redundant data for reducing the amount of data for real time transmission and reproduction of the video signal over narrow bandwidth data paths, said encoder-compressor comprising:

means for block coding the analog video signal into sequential matrices of pixels, the matrices being of a size N, and each pixel being represented by a bit map and a digital word defining the color and luminance of N reference colors, where N is variable between 2 and a switch selectable number of colors X, said block coding means having an input and an output, means for changing and selecting the block matrix size to correspond with N for retaining coding efficiency by inserting substitute block coding circuitry connected at the input and output of said block coding means, means for finding, characterizing and coding data, receiving the output of said block coding means and storing the encoded data in current and previous memory registers in blocks and frames, means for inter-frame comparison of each block in the memory registers with the corresponding block in the previous frame to determine whether it is unchanged from the previous block or designated a new block, and means for compression where the current R G B colors compared to the corresponding colors of the previous frame or block, multiplied by the previous block colors, equals the current block colors or if the difference is small, encoding the current color value as the difference, whereby an analog video signal is encoded and compressed to lower the bit rate for transmission over narrow channels, and the number N of non-redundant colors is changeable with corresponding block size change, to optimize the color fidelity over the narrow band channel.

2. A color data coder-compressor system according to claim 1, wherein said means for selecting and changing the block matrix size for each N group of color data sample further comprises:

a first and at least a second integrated circuit block coder chip, each chip having a unique N and matrix size, and electrical switch means for selecting said first or said at least a second integrated circuit chip block coder.

3. A color data coder-compressor system according to claim 2, wherein said electrical switch means is a multi-contact diode switch.

4. A color data coder-compressor system according to claim 2, wherein said electrical switch means is a multi-contact diode switch integral with the integrated circuit chip block coder.

5. A color data coder-compressor system according to claim 2, wherein said electrical switch means is a rotary contact electrical switch.

6. A color data coder-compressor system according to claim 2, wherein said electrical switch means is a circuit board socket and the block coder is a plug-in circuit.

7. A cable television system for distributing standard R G B color television programming over narrow band lines like telephone lines and power lines, comprising:

a color data coder-compressor for color video imaging, wherein an analog video data stream is digitized and block-encoded into blocks and frames of selectable size matrices of pixels and a selectable number N of colors per frame with luminance, and bit mapped in groups of variable bit length for further compressing the video data by differentiating present frame and previous frame, and differentiating present block and previous block, to reduce the amount of data for real time transmission and reproduction of the image over narrow bandwidth data paths, said encoder-compressor including:

means for block coding the analog data stream into sequential matrices of elements, said block matrices being of a size related to N, each pixel being represented by a digital word defining the color value of N reference colors, where N is variable between 2 and X, and a bit map, said block coding means having block coded pixel output data at television frame rates, switch means for selecting and changing the block matrix size for each N group of color data sampled by substituting said means for block coding, with one having a larger or smaller N, means for inter-frame and intra-frame comparison of each block with the corresponding block in the previous frame to determine if it is unchanged from the previous block or frame or designated a new block, means for compression wherein the current R G B colors compared to the corresponding colors of the previous frame or block, multiplied by the previous frame or block colors, equal the current block colors or if the difference is small, encoding the current color value as the difference, means for transmitting the compressed, block coded R G B data onto the narrow band line, a decompressor-decoder including decompressor means receiving the R G B data from the narrow band line for reconstructing each frame from the frame bit map and placing into frame memory, block decoder means wherein the block bit map is used to decode the color values with reference to a look-up table in the block decoder, on a line basis, the result being stored in a line buffer as a previous line, a line buffer which memorizes the previous line data for comparison with a current line, reconstructor means for comparing the previous line data and the block decoder data and applying a correction algorithm, said reconstructor means having a corrected digital R G B data output, digital-to-analog converter means to recover the analog R G B color sequential video frame signal from the digital data, and television display means monitoring the R G B video frame signal images to display television programming, whereby an analog color video signal is encoded and compressed to lower the bit rate for transmission over narrow channels, and the number N of non-redundant colors is changeable between 2 and X, with corresponding block size change, thus to optimize the color fidelity when coded and compressed, transmitted, decompressed and decoded over the narrow band hard wired telephone or power lines.

* * * * *